United States Patent [19]

Monchiero

[11] Patent Number: 5,240,325
[45] Date of Patent: Aug. 31, 1993

[54] MIXING HEAD FOR INJECTING MATERIALS, INCLUDING MEANS FOR CLEANING THE INJECTION CHAMBER THEREOF

[76] Inventor: Giovanni Monchiero, Via Ravizza, 5, 28066 - Galliate (Novara), Italy

[21] Appl. No.: 776,993

[22] Filed: Oct. 16, 1991

[30] Foreign Application Priority Data

Dec. 18, 1990 [IT] Italy .................. 22407 A/90

[51] Int. Cl.$^5$ .................. B01F 5/04; B01F 15/02; B01J 14/00
[52] U.S. Cl. .................. 366/138; 366/173; 366/177; 422/133; 222/145; 222/148; 222/151
[58] Field of Search .................. 422/133; 425/200, 205; 137/896, 897; 366/134, 138, 167, 173, 177, 182; 239/398; 222/145, 149, 148, 151

[56] References Cited

U.S. PATENT DOCUMENTS

| | | | |
|---|---|---|---|
| 3,026,183 | 3/1962 | Cole, III | 366/138 X |
| 3,180,350 | 4/1965 | Rill, Jr. et al. | 366/138 X |
| 3,206,171 | 9/1965 | Levake | 366/138 |
| 3,220,801 | 11/1965 | Rill, Jr. et al. | 422/133 |
| 3,450,388 | 6/1969 | Stump | 366/138 |
| 3,960,506 | 6/1976 | Schmitzer | 366/138 X |
| 4,043,486 | 8/1977 | Wisbey | 366/138 X |
| 4,193,701 | 3/1980 | Koch et al. | 366/159 |
| 4,344,919 | 8/1982 | Kelterbaum | 422/133 |
| 4,351,354 | 9/1982 | Hilterhaus et al. | 366/138 X |
| 4,775,517 | 10/1988 | Sulzbach | 422/133 |

*Primary Examiner*—Harvey C. Hornsby
*Assistant Examiner*—Charles Cooley
*Attorney, Agent, or Firm*—Bucknam and Archer

[57] ABSTRACT

A mixing head has a holding body, in which there is tightly supported a rotary body having inlet ducts for the materials to be mixed, leading to a mixing chamber. A delivery duct extends from the mixing chamber for delivering the mixed materials and the inlet ducts are selectively coupled to both plastic material inlet openings and to a washing fluid inlet chamber.

1 Claim, 2 Drawing Sheets

MIXING HEAD FOR INJECTING MATERIALS, INCLUDING MEANS FOR CLEANING THE INJECTION CHAMBER THEREOF

BACKGROUND OF THE INVENTION

The present invention relates to a mixing head for injecting materials, including means for cleaning the injection chamber thereof.

As is known, for making some plastic materials, there are conventionally used plastic material mixing or blending heads which are specifically designed to deliver two discrete components which, upon mixing, are injected so as to provide the desired end product.

Prior mixing or blending heads for the intended use are, however, greatly complex construction-wise and the mixing chamber thereof is difficult to be properly cleaned which can lead to a possible obstruction of the mixing chamber with a consequent malfunction of the mixing head.

SUMMARY OF THE INVENTION

Accordingly, the main object of the present invention is to overcome the above mentioned drawbacks, by providing a plastic material mixing head which is very simple construction-wise and the mixing chamber and delivery ducts of which can be easily and quickly cleaned.

Another object of the present invention is to provide such a mixing head which has a very reduced weight and a very compact construction and the component pieces thereof, moreover, can be easily and quickly removed for the maintenance thereof.

Another object of the present invention is to provide such a mixing head which is very reliable in operation and which can be easily made starting from easily available materials and elements and which, moreover, is very competitive from a mere economic standpoint.

According to one aspect of the present invention, the above mentioned objects, as well as yet other objects, which will become more apparent hereinafter, are achieved by a mixing head for injecting plastic materials, including means for cleaning an injection chamber thereof, characterized in that said mixing head comprises a holding body inside which there is tightly supported a movable body provided with plastic material inlet ducts, said ducts leading to said mixing chamber, a mixed plastic material delivery duct extending from said holding body, said inlet ducts being arranged for selectively coupling both to plastic material inlet openings and to a washing fluid inlet chamber.

BRIEF DESCRIPTION OF THE DRAWINGS

Further characteristics and advantages of the present invention will become more apparent from the following detailed disclosure of a preferred, though not exclusive, embodiment thereof, which is illustrated, by way of an indicative but not limitative example, in the accompanying drawings, where.

DESCRIPTION OF THE PREFERRED EMBODIMENT

Figure 1:
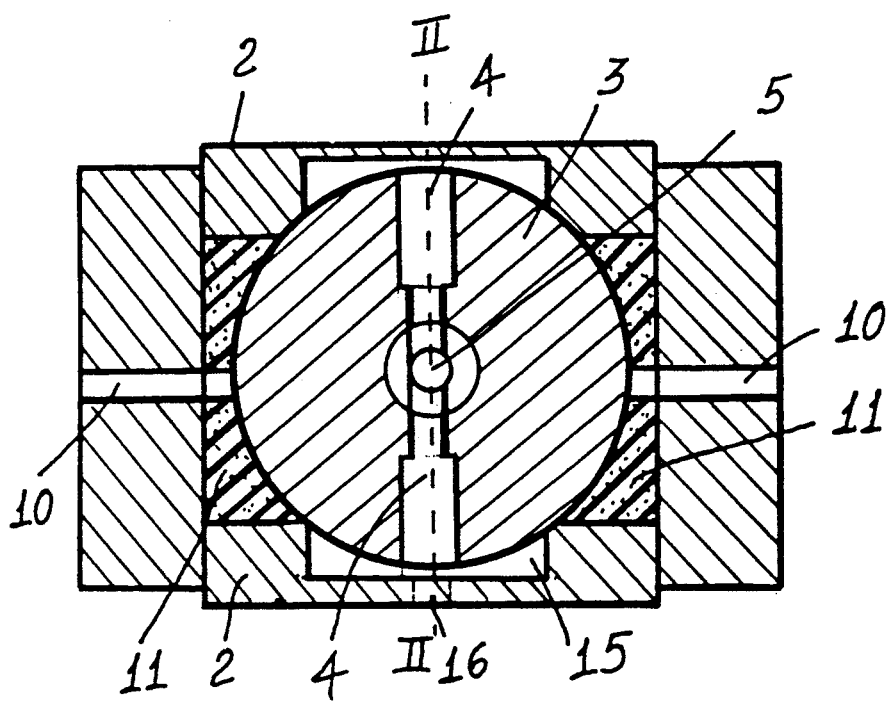
FIG. 1 is a schematic view showing a mixing head according to the present invention during a washing step thereof.
Figure 3:
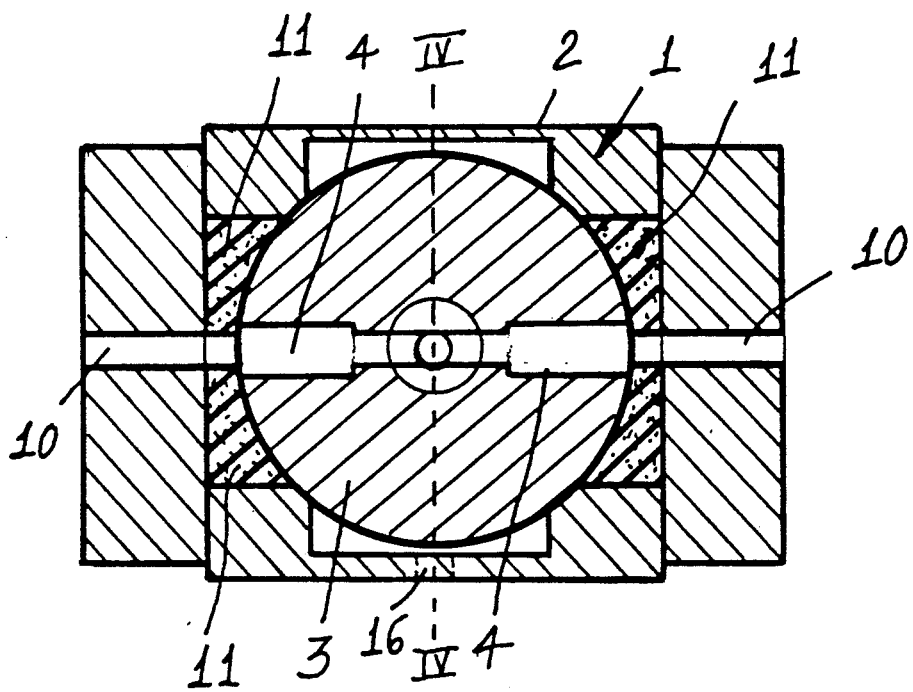
FIG. 3 shows the subject mixing head during the operation thereof, in which the mixed materials are delivered.
Figure 2:
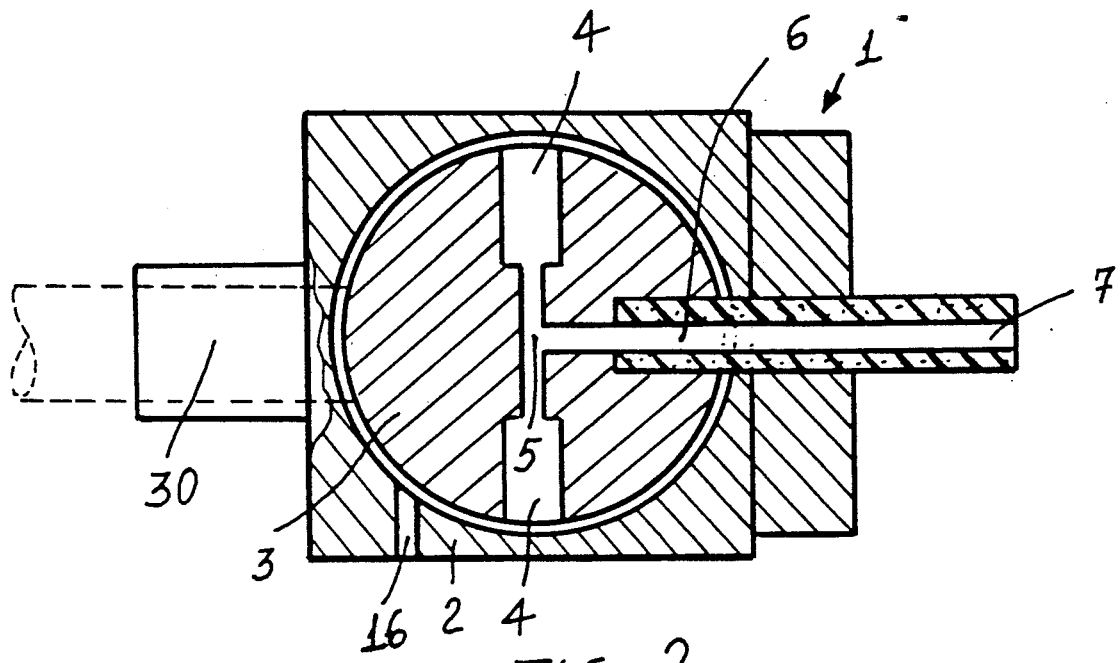
FIG. 2 is a cross-sectional view of the mixing head substantially taken along the line II—II of FIG. 1.
Figure 4:
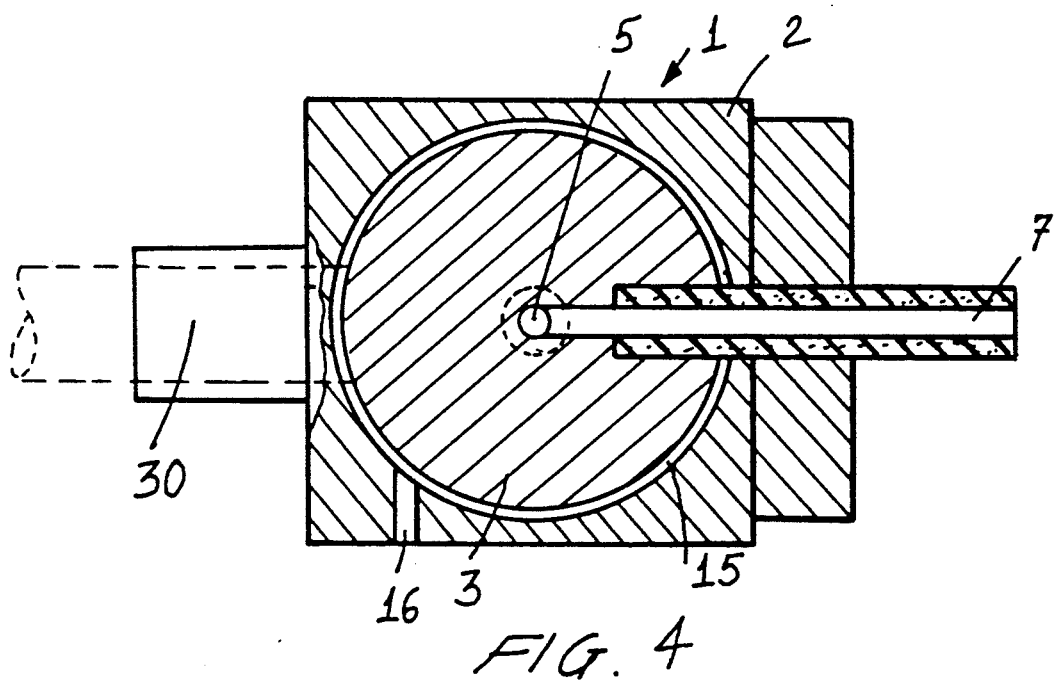
FIG. 4 is a cross-section view taken along the line IV—IV of FIG. 3.

With reference to the number references of the figures of the accompanying drawings and, more specifically, to FIGS. 1 to 4, the mixing head for mixing plastic materials, according to the present invention, and which has been generally indicated at the reference number 1, comprises a holding body 2, inside which there is rotatably tightly supported a movable or rotary body 3 which may have either a cylindrical or a ball shape.

The body 3 is provided with two inlet ducts 4, which are diametrically arranged and lead to a mixing chamber 5 which, as shown, is arranged substantially at the central portion of the rotary body 3; from these ducts a delivery duct 6 extends which is perpendicular to said inlet ducts 4.

The delivery duct 6 is provided for connection, in a tight way, with a delivery outlet 7 provided on the holding body 2.

The holding body, moreover, comprises a pair of opposite inlets 10 for introducing into said holding body 2 the two component materials to be mixed and is also provided, at the mentioned inlets 10, with sealing gaskets 11 sealing said inlet ducts of the movable body 3.

Offset by 90° with respect to the inlets 10 there is provided a washing chamber 15, communicating with a coupling fitting 16, and into which air, a solvent or other washing material can be introduced, so as to provide a washing or cleaning fluid. As clearly shown in FIG. 4, the washing chamber 15 actually defines with the rotary body 3 a peripheral gap which peripherally encloses the rotary body 3 itself.

With the disclosed arrangement, as the inlet ducts 4 are registered with the inlets 10, the materials to be mixed can be introduced, through said ducts 4, into the mixing chamber 5, therefrom the mixed material will be ejected through the duct 6.

As the mixing chamber 5 is to be cleaned or washed, the movable body 3 must be simply rotated through 90°, about an axis substantially coinciding with the delivery duct axis, so as to cause the inlet ducts 4 to be arranged at the washing chamber 15 which will affect both the ducts and the mixing chamber, so as to remove therefrom possible deposits and the like.

In this connection it should be moreover pointed out that a small cleaning piston 30 can also be provided arranged axially aligned with the delivery duct 6 and which will be introduced into the mixing chamber so as to shut off the ducts 4 and, simultaneously, clean both the mixing chamber and said delivery duct 6.

As this piston is withdrawn, it will automatically disengage the inlet ducts 4 of the mixing chamber and will cause the material inlet ducts 4 to communicate with said mixing chamber.

The movable body 3 which, as stated, may have either a ball or cylindrical shape, can be turned either manually or by a pneumatic or hydraulic piston.

From the above disclosure it should be apparent that the invention fully achieves the intended objects.

In particular, the fact is to be pointed out that a mixing head has been provided having a very simple construction and providing the advantage that the mixing chamber and delivery duct thereof can be easily, quickly and fully cleaned.

The invention as disclosed is susceptible to several modifications and variations all of which will come within the scope of the inventive idea.

Moreover, all of the details can be replaced by other technically equivalent elements.

I claim:

1. A mixing head for injecting plastic materials, said mixing head comprising a holding body having two opposite plastic material inlets, inside said holding body there being tightly supported a rotary body turning about a turning axis and defining at a central portion thereof a mixing chamber, said rotary body being provided with two plastic material inlet ducts diametrically arranged with respect to said mixing chamber and leading to said mixing chamber, a mixed plastic material delivery duct extending from said mixing chamber, said delivery duct having an axis substantially coinciding with said turning axis of said rotary body, in said holding body there being moreover defined a washing chamber peripherally encompassing said rotary body and communicating with a coupling fitting for supplying said washing chamber with a washing fluid, said washing chamber being offset by 90° about said turning axis with respect to said opposite plastic material inlets of said holding body, said rotary body being turned about said turning axis so as to selectively register said plastic material inlet ducts either with said opposite inlets or with said washing chamber, said mixing head further comprising sealing gaskets sealing said inlet ducts of said rotary body, and a cleaning piston aligned with said delivery duct and adapted to be driven into said mixing chamber and delivery duct so as to shut-off said inlet ducts and clean said mixing chamber and delivery duct.

* * * * *